(12) United States Patent
Rich et al.

(10) Patent No.: US 7,290,368 B2
(45) Date of Patent: Nov. 6, 2007

(54) DISPOSABLE FLYING INSECT TRAP

(75) Inventors: Christopher T. Rich, Leola, PA (US);
Edward J. Holliday, Hummelstown, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/931,046

(22) Filed: Sep. 1, 2004

(65) Prior Publication Data

US 2006/0042154 A1    Mar. 2, 2006

(51) Int. Cl.
*A01M 1/10*    (2006.01)

(52) U.S. Cl. .......................................... 43/122; 43/107

(58) Field of Classification Search .................. 43/107, 43/122, 118
See application file for complete search history.

(56) References Cited

U.S. PATENT DOCUMENTS

| | | | |
|---|---|---|---|
| 4,501,088 A * | 2/1985 | Boisvert et al. .............. | 43/118 |
| 4,551,941 A | 11/1985 | Schneidmiller | |
| 4,571,880 A * | 2/1986 | Hayward ..................... | 43/122 |
| 4,706,410 A * | 11/1987 | Briese ......................... | 43/107 |
| 4,873,787 A * | 10/1989 | Schneidmiller .............. | 43/122 |
| 4,899,485 A * | 2/1990 | Schneidmiller .............. | 43/122 |
| 5,133,150 A * | 7/1992 | Briese ......................... | 43/122 |
| 5,226,254 A * | 7/1993 | MacMenigall ............... | 43/107 |
| 5,359,808 A * | 11/1994 | Fitsakis ....................... | 43/132.1 |
| 5,392,558 A * | 2/1995 | Blomquist .................... | 43/107 |
| 5,682,706 A | 11/1997 | Altenburg | |
| 6,532,695 B1 * | 3/2003 | Alvarado ..................... | 43/122 |
| 6,609,329 B2 * | 8/2003 | McCallum ................... | 43/107 |
| 2004/0231229 A1 * | 11/2004 | Lenker ........................ | 43/107 |

OTHER PUBLICATIONS

Product sample of REDTOP brand fly trap and packaging data sheets of FliesBeGone fly trap product (2 pages).
Product sample of VICTOR brand yellow jacket and flying insect bottle trap and web page describing product (1 page).
Product sample of VICTOR brand Fly Magnet bottle trap and web page describing product (1 page).
Product sample of RESCUE brand disposable fly trap and we pages describing product (2 pages).
REDTOP fly trap, product sample.
VICTOR bottle traps, product samples.

* cited by examiner

*Primary Examiner*—Kurt Rowan
(74) *Attorney, Agent, or Firm*—Jacobson Holman PLLC

(57) ABSTRACT

A disposable flying insect trap having an entry plate with a plastic bag affixed to the entry plate periphery and including entry plate port openings for receiving the insects. The entry plate is sealed by a lid which is removable for insertion of liquid therewithin. The lid is positionable from its sealed position to a second position spaced from the entry plate surface and defining a gap therebetween to enable the insects to fly into the bag interior, attracted by the bait within the bag. The lid is removable from the entry plate by a hang cord which, when pulled, dislodges the lid from the entry plate surface.

27 Claims, 3 Drawing Sheets

DISPOSABLE FLYING INSECT TRAP

BACKGROUND OF THE INVENTION

1. Field of the Invention

The present invention generally relates to a disposable flying insect trap requiring no tools, cutting, or special hangers for set up, use and disposal. More specifically, the present invention relates to a disposable flying insect trap having a pre-installed bait packet within a plastic bag that hangs from the periphery of an entry plate. The entry plate includes entry port openings through which flying insects may enter for capture within the plastic bag. A lid is secured to the entry plate in its shipped condition to seal the entry port openings and bag interior to the atmosphere. The lid is removable by the user and connectable to the entry plate in a second, in use, position whereby the lid is displaced from the entry plate surface to enable opening of the entry ports to the surrounding environment. The lid is removable from the entry plate through a pull cord that also acts as a hang cord for the bag.

2. Description of the Related Art

Disposable flying insect traps are known. Such traps may include a flexible containment bag that includes bait or attractant material within the bag to be mixed with water to attract the flying insects. Such bag may include an upper support member that has an opening for the flying insects to enter the bag. When the flying insects are attracted to enter into the bag interior, they will be trapped therein and will drown in the liquid. The bag may then be discarded after use. See, for example, U.S. Pat. Nos. 5,682,706; 4,899,485; 4,873,787; and 4,551,941. One commercially available disposable fly trap is known as the Rescue! Fly Trap®.

One of the problems with the current traps on the market, such as the Rescue! Fly Trap®, is that the consumer is required to cut open the entry area before filling the trap with water. Thus, separate tools, such as scissors or knives, are needed to prepare the trap before placement at a convenient location. Hence, a need has arisen for a trap requiring minimal effort for the consumer in installation requiring no separate tools, cutting, or special hangers. Such prior art traps also inherently leak and spill when discarded because there is no adequate closure to seal the bag after use. Thus, a need has arisen for a disposable flying insect trap that includes a cost effective resealing structure for sealing the trap after use to prevent leakage or spillage.

SUMMARY OF THE INVENTION

In order to overcome the deficiencies of the prior art, the disposable flying insect trap of the present invention includes an insect entry plate with a plastic bag secured to and hanging from the entry plate periphery. The plastic bag contains insect attractant, and the entry plate includes at least one entry port through which insects can pass for capture within the bag. A lid is connectable to the entry plate and is adjustably positioned from a first position that seals the lid to the entry plate and thus closes off the entry port and the bag interior to the surrounding environment. The lid is adjustably positioned to a second position where the lid is displaced from, and defines a gap relative to, the entry plate surface to enable the entry port and bag interior to be in communication with the surrounding environment so that the flying insects can fly into the bag interior.

The adjustable positioning of the lid to the entry plate is preferably accomplished by providing a plurality of circular sockets and a plurality of cylindrical posts adjacent to the sockets on the entry plate upper surface. The lid includes complementary pins on its lower or underside surface that are defined by a cylindrical wall with an open cylindrical recess. The lid is, in a first position, sealingly attached to the entry plate by inserting the lid pins within the entry plate sockets to retain the lid to the entry plate whereby the lid forms a seal with the entry plate upper surface. The lid is removable and positionable in a second position displaced from the entry plate upper surface by attaching the lid pins onto the posts of the entry plate whereby the cylindrical recesses of the lid pins are inserted over the. entry plate posts to maintain the lid in a spaced apart position from the entry plate upper surface.

The disposable insect trap is assembled and packaged for the consumer such that the insect attractant is within the plastic bag and the lid is sealed to the entry plate and plastic bag in its first position. The consumer will remove the lid from the first sealed position and will fill the plastic bag with water or other liquid to a desired level as instructed. The lid will be re-connected in the second position to enable the lid to be supported by, yet spaced from, the entry plate upper surface and the assembled fly trap can then be hung at a desired location.

Removal of the lid from the entry plate may require some force, but without the use of separate tools, because the lid is intended to be tightly secured and sealed to the entry plate during shipment. This removal is accomplished by a hang cord that is retained by the entry plate and loops through holes in the lid that are offset from the points where the cord is retained on the entry plate. Thus, a portion of the hang cord is in facing or parallel relationship to the underside of the lid when the lid is sealed to the entry plate such that when the hang cord is pulled by the user, an upward force is directed to the underside of the lid to dislodge or disengage the lid from the entry plate.

When the fly trap is spent, i.e., when the amount of flies collected is substantial and/or the attractant weakens after a period of time in accordance with the type of attractant utilized, the lid is removed from its second position and re-installed to its first sealed position. A tight seal is thus provided for disposal of the fly trap without leakage or spillage.

It is therefore an object of the present invention to provide a disposable flying insect trap that is sealable prior to use and resealable after use.

Another object of the present invention is to provide a disposable flying insect trap that is installed without use of any separate tools and requires no cutting or other special installation.

It is a further object of the present invention to provide a disposable flying insect trap that is sealable and resealable to protect the water-soluble bait packet during distribution, until use, and also serves to eliminate messy spills or splashes during disposal.

Still further, it is an object of the present invention to provide a disposable flying insect trap with a sealable lid that can be readily removed from its sealed position without separate tools and without requiring great effort by the consumer. More specifically, the removal of the lid is accomplished by pulling up on the hang cord that is used to hang the assembly. This pulling action on the hang cord applies an upward force component to the underside of the lid, at the lid hole edges, which displaces or disengages the lid from the entry plate.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The drawings serve to illustrate the present invention, but are not intended to be drawn to scale.

DESCRIPTION OF THE PREFERRED EMBODIMENTS

Figure 3:
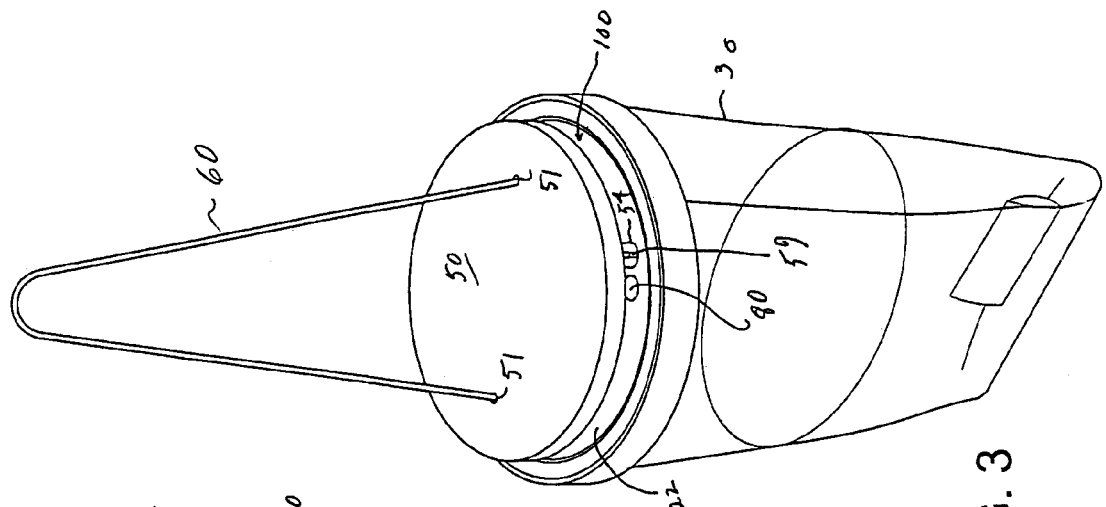
FIG. 3 is a perspective view of the disposable flying insect trap shown in FIG. 1 with the lid in its displaced second position.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

Referring now to the drawings, a preferred embodiment of the disposable flying insect trap according to the present invention is designated generally by the reference numeral 10 and includes an entry plate of preferably circular profile, generally designated by reference numeral 20, with a plastic bag 30 secured to, and hanging from, the plate periphery 23. The plastic bag 30 is retained to the plate by a retaining ring 40. A lid 50 is detachably and adjustably connected to the entry plate 20 in a manner to be described. A hang cord or string 60 is retained by the entry plate 20 and looped through lid holes 51 in the lid 50. A bait packet 32 is disposed within the plastic bag 30 during shipment with the lid 50 sealed to the entry plate 20. The bait packet 32, when mixed with water (FIG. 2), provides an attractant to the insects as is known in the art. The disposable insect trap 10 is shipped with the lid 50 sealed to the entry plate (FIG. 1), the lid 50 is removed by the consumer from the entry plate 20 and the bag 30 is filled partially with water or other liquid (FIG. 2), and the lid 50 is then positioned on the entry plate 20 in a spaced apart arrangement from the entry plate surface 22 to enable flying insects to enter into the plastic bag for destruction (FIG. 3). When the attractant is spent or the plastic bag otherwise filled with insects, or when disposal is desired for any reason, the lid 50 is then secured to the entry plate in its sealed position and the trap is discarded.

Turning now to the specific components of the invention, the entry plate 20 includes an upper surface 22 that is preferably slightly domed, as shown, and preferably of circular profile. At its circumferential periphery 23, the entry plate 20 includes a downwardly oriented skirt 21 with an annular trapezoidal notch 24 in the outwardly facing skirt surface which serves as one clamping surface for clamping the plastic bag to the entry plate periphery. (See FIGS. 7 and 9.) A clamping or retaining ring 40 of generally annular configuration has an internally facing trapezoidal annular projection 41 which is complementary to and receivable within the notch 24 of the skirt 21. The upper edge of the plastic bag 30 is clamped between the skirt 21 of the entry plate 20 and the retaining ring 40.

The retaining ring 40 and the entry plate 20 are preferably both made of rigid PVC material, and the retaining ring is sized to slide upward from a direction below the bottom of the entry plate with the bag positioned adjacent to the entry plate skirt 21 to provide a taut snap fit between the retaining ring and skirt with the bag therebetween. The retaining ring 40 grips and retains the plastic bag against the entry plate skirt 21 with sufficient strength so that the bag will remain retained to the entry plate when the bag is filled with water. Although a rigid PVC retaining ring that is snap fitted into the notch 24 of the skirt to support the plastic bag is preferred, other arrangements for maintaining the plastic bag to the entry plate periphery can be provided. For example, the retaining ring could be manufactured from a flexible band or the plastic bag could be heat sealed to the edge of the entry plate periphery. Generally, any technique for securing the plastic bag 30 to the entry plate periphery 23 may be utilized.

Inward of the entry plate periphery 23 is a channel 25 of circular configuration that receives the lid edge 52, in a manner to be described. (See FIGS. 7 and 9.) This channel 25, when engaged with the lid edge 52, provides for a seal between the entry plate 20 and the lid 50. As used herein, the terms "seal" or "sealable" mean sufficient liquid sealing to prevent leakage of fluid within the bag as it is being disposed and sufficient air-sealing to protect against obnoxious odors escaping from the bait packet when the trap is being shipped and before use.

Figure 2:
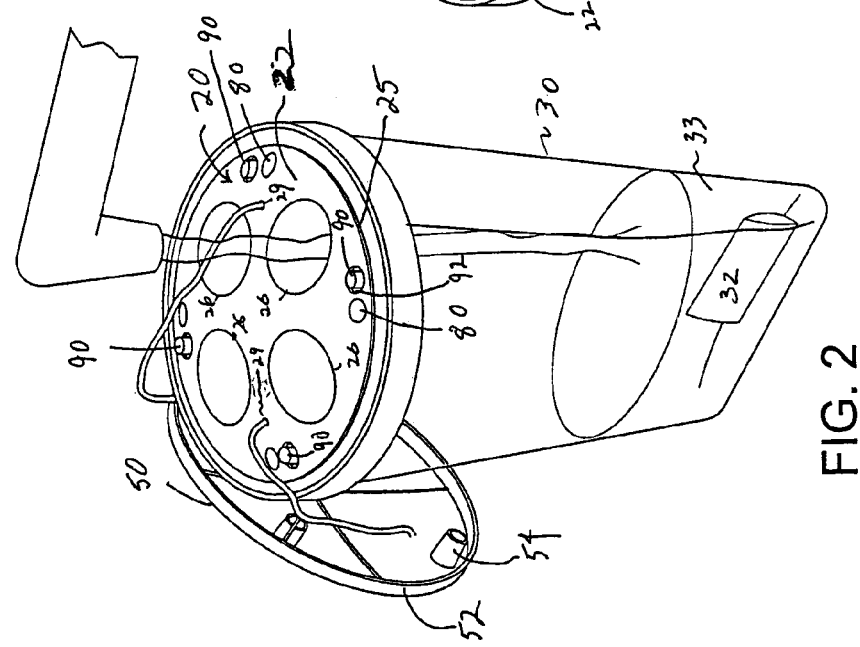
FIG. 2 is a perspective view of the disposable flying insect trap shown in FIG. 1 with the lid removed from, and hanging from, the entry plate and showing the entry of liquid into the bag interior.

The entry plate 20 includes a plurality of entry plate ports 26. Four ports are shown, but the exact number may vary and still be within the scope of the present invention. Each of the entry ports 26 includes substantially conically-shaped extensions 27 disposed toward the interior of the plastic bag 30. The entry ports 26 enable water or other liquid to be poured into the plastic bag for activation of the attractant, as shown in FIG. 2, as is known in the art. The entry ports 26 also provide an entryway for flying insects to enter into the plastic bag 30 when attracted by the bait 32, thus being retained in the plastic bag by contact with the liquid 33.

Figure 13:
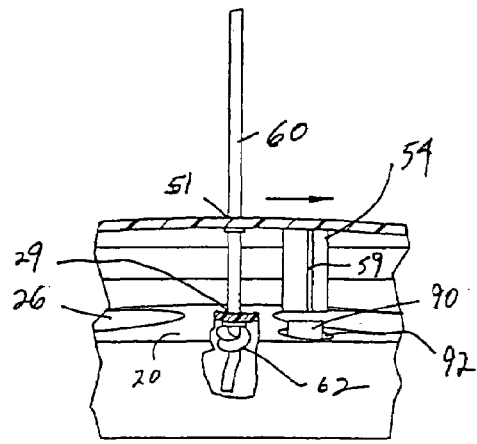
FIG. 13 is an enlarged cross-sectional view similar to FIGS. 11 and 12, but showing the lid removed from the entry plate and the hang cord retained by the entry plate.

Diametrically aligned entry plate cord holes 29 are provided through the entry plate surface 22 inwardly from the entry plate periphery 23. The cord holes 29 retain the hang cord 60 to the entry plate 20. As shown in FIG. 13, the cord 60 is retained by the entry plate by tying off or knotting 62 the ends of the hang cord underneath the entry plate. The hang cord 60 forms a loop through the cord holes 29 and the lid holes 51 of the lid 50, in a manner to be described, to enable the flying insect trap 10 to be supported from a convenient hook or other support member (not shown) at the desired location.

Figure 7:
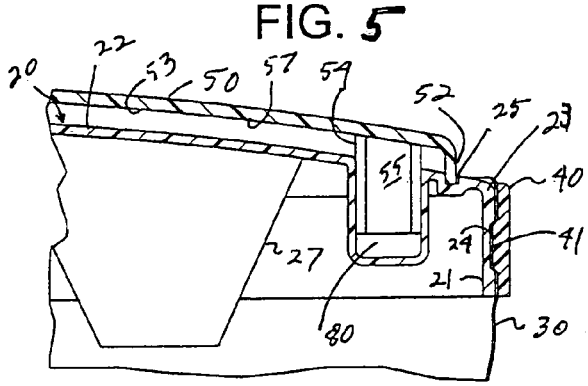
FIG. 7 is a partial cross-sectional view taken along line 7-7 of FIG. 4 showing the lid sealed to the entry plate by the lid pin inserted in the entry plate socket.

Disposed adjacent the entry plate periphery 23 are a plurality of entry plate sockets 80. Four sockets 80 disposed 90° apart from each other are shown, but the exact number could vary without departing from the scope of the present invention. Each of these sockets 80 define cylindrical recesses, having circular openings to receive pins 54 disposed on the underside 53 of the lid 50, in a manner to be described. When the lid pins 54 are inserted within the sockets 80, as best shown in FIG. 7, the lid 50 is securely fastened to the entry plate 50 with the lid edge 52 tightly received within the peripheral channel 25 on the top surface 22 of the entry plate 20 to form the seal. This sealed position of the lid 50 on the entry plate 20 is defined as the first position.

Adjacent each of the sockets 80 on the entry plate 20 are a plurality of entry plate posts 90. The posts 90 are shown as four in number and also disposed 90° apart. The posts 90 are generally cylindrical and integrally formed in the upper surface 22 of the entry plate 20. The posts 90 are preferably recessed slightly into the entry plate surface 22 to define a circular channel 92 about each post. As will be described, the posts 90 are sized to receive the lid pins 54 by insertion of the posts 90 into the lid pin cylindrical recess 55, as will be described. When fully inserted, the lid 50 will be secured to the entry plate 20, but spaced from the entry plate surface 22 to form a gap 100 between the entry plate surface 22 and the underside 57 of the lid 50 to enable the insects to fly or crawl through the gap 100, through the entry ports 26 and into the plastic bag interior. This offset position of the lid 50 with respect to the entry plate 20 is defined as the second position.

The lid is of substantially circular profile having a diameter less than that of the entry plate and preferably also formed of rigid PVC material. The lid 50 is shown to have a slightly domed or convex shape with a downwardly extending circumferential edge or lip 52 that is sized relative to the entry plate channel 25 to be tightly secured therewithin. That is, the width of the edge 52 is substantially equal to the channel 25 width so that the lid 50 is tightly secured therewithin to define a seal between the lid 50 and the entry plate 20. The lid 50 includes a pair of lid holes 51 for receiving the looped hang cord 60. The lid holes 51 are along a diameter of the lid, but are angularly disposed with respect to the entry plate cord holes 29 when the lid 50 is secured to the entry plate 20 in its first or sealed position. Thus, when the lid 50 is secured to the entry plate 20 in a sealed position, the hang cord 60 retained by the entry plate 20 is diverted slightly to travel laterally underneath the lid surface 57 and exit the lid at lid holes 51 slightly displaced from the position of the hang cord retention openings 29.

Figure 11:
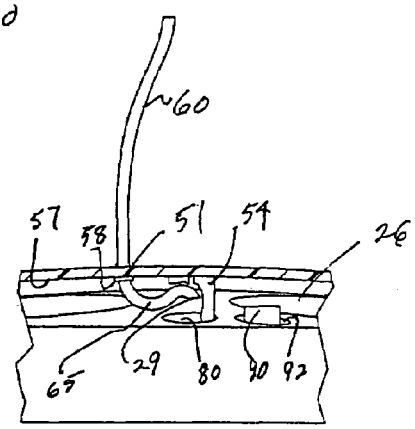
FIG. 11 is an enlarged cross-sectional view from FIG. 10, showing the hang cord disposed between the entry plate upper surface and the underside of the lid in the first or sealed position.
Figure 12:
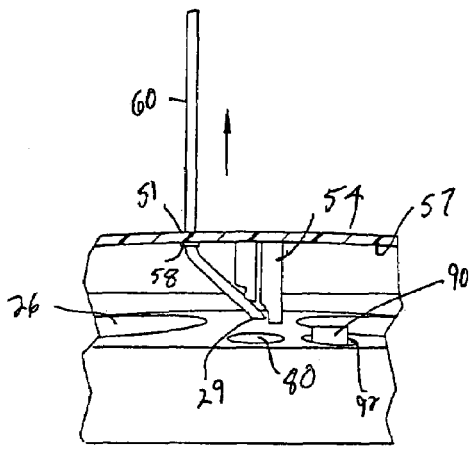
FIG. 12 is an enlarged cross-sectional view similar to FIG. 11, but showing the movement of the lid from the sealed position when the hang cord is pulled.

Stated otherwise, as can be seen in FIG. 11, the lid holes 51 are not aligned with the cord holes 29 and a portion 65 of the hang cord 60 lies in facing relationship to the underside 57 of the lid 50 in the sealed position. Disengagement of the lid 50 from the entry plate 20 is accomplished by pulling up on the hang cord 60, as shown on FIG. 12, whereby the offset orientation of the lid holes 51 and the entry plate cord holes 29 provide for an upwardly directed force component on the underside 57 of the lid 50 which force component is directed primarily to the edges 58 of lid hole openings 51. This pulling up of the hang cord 60 by the user enables the lid 50 to be dislodged or disengaged from the entry plate 20.

The lid holes 51 can lie along the same circumference as the entry plate cord holes 29, but angularly displaced along the circumference slightly. Alternatively, the lid holes 51 and entry plate cord holes 29 could be oriented radially with respect to each other. It is important only that they be sufficiently offset, i.e., not aligned with each other when the lid 50 is sealed to the entry plate 20. This offset enables a portion 65 of the hang cord to be disposed laterally underneath the lid 50 between the lid and the entry plate surface 22 so that an upwardly directed force is provided on the lid when the hang cord is pulled.

Figure 9:
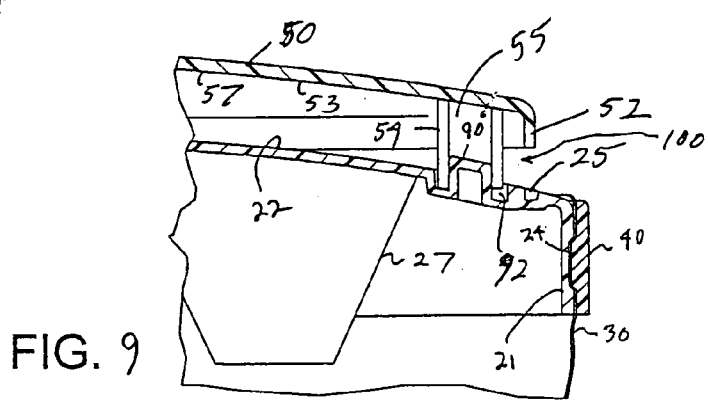
FIG. 9 is a cross-sectional side view taken along line 9-9 of FIG. 8 showing the lid connected with the entry plate where the entry plate post is fitted within the cylindrical recess of the lid pin.

Disposed from the underside 57 of the lid 50 are a plurality of lid pins 54, preferably four in number, complementary to the socket openings 80 of the entry plate 20. The pins 54 are substantially cylindrical in contour with opposed slits 59 to enable pin wall flexing. The pins 54 are open at the bottom and define a cylindrical recess 55. The cylindrical recess 55 is sized to provide a firm fit over the posts 90 of the entry plate as shown in FIG. 9. Similarly, the outer circumference of the pins 54 are sized to be tightly received within the sockets 80, with some flexibility, to provide a tight and secure fit when the lid 50 is in the sealed or first position.

Figure 1:
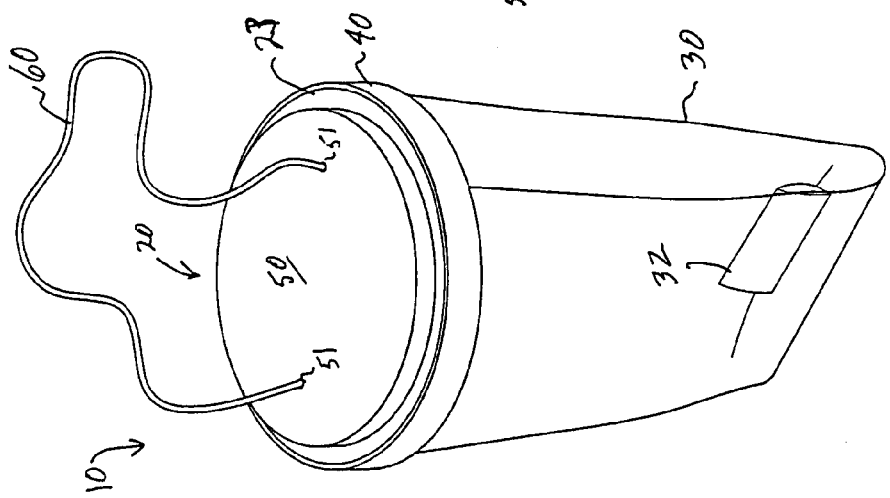
FIG. 1 is a perspective view of the disposable flying insect trap of the present invention with the lid sealed to the entry plate.
Figure 4:
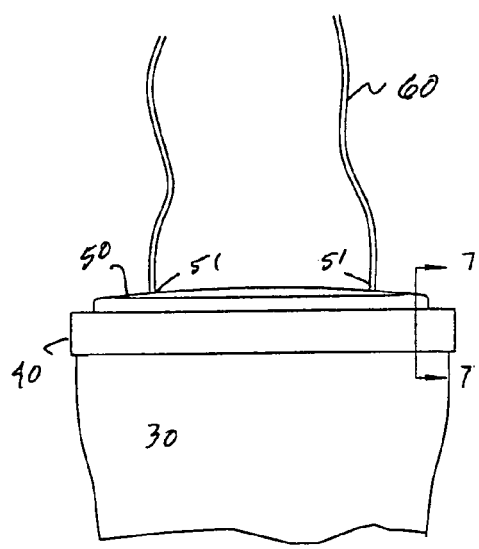
FIG. 4 is a partial side view of the disposable flying insect trap shown in FIG. 1 with the lid in a sealed position.
Figure 5:
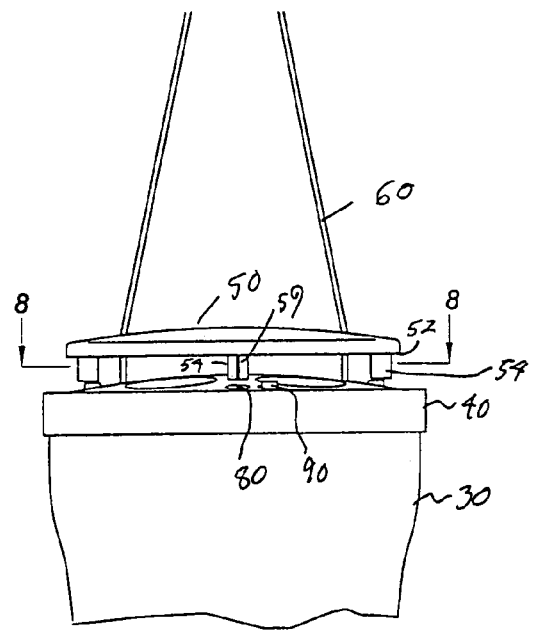
FIG. 5 is a partial side view of the disposable flying insect trap shown in FIG. 1 with the lid being removed from the entry plate.
Figure 8:
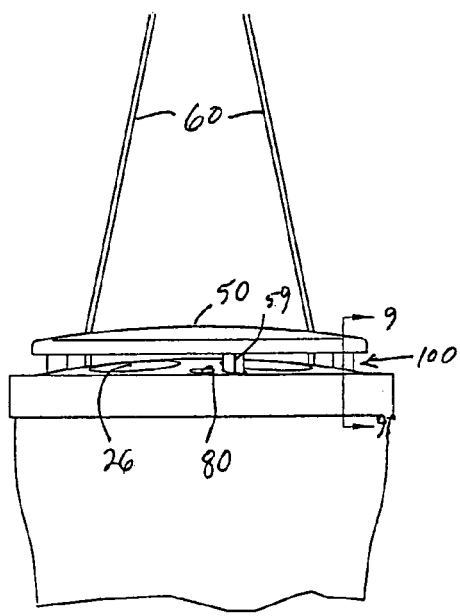
FIG. 8 is a partial side view of the insect trap shown in FIG. 1 with the lid in a second position to define a gap or space between the entry plate upper surface and the underside of the lid.
Figure 6:
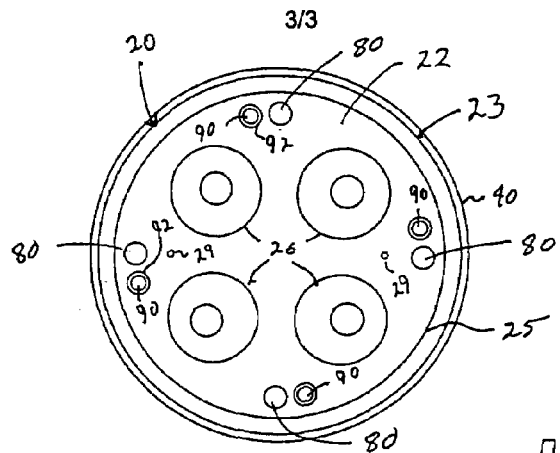
FIG. 6 is a top view of the entry plate of the insect trap shown in FIG. 1 with the lid removed.
Figure 10:
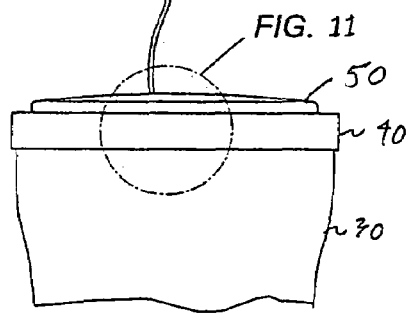
FIG. 10 is a partial side view of the insect trap shown in FIG. 1 with the lid secured to the entry plate.

Utilization of the disposable flying insect trap 10 is as follows. Before use, the trap 10 is assembled with the bait packet 32 within the bag 30 and with the lid 50 sealed to the entry plate 20, as shown in FIG. 1. The user will remove the lid 50 from the entry plate 20, by pulling on the hang cord 60, as shown sequentially in FIGS. 11-13. When the lid 50 is dislodged and then disengaged from the entry plate, the lid can hang freely from the bag as shown in FIG. 2. Water or other liquid will then be deposited within the bag to a desired level in accordance with user instructions (see FIG. 2). When the bag 30 is filled to the desired level, the lid 50 is placed back on the entry plate 20 in its second position such that the split pins 54 of the lid 50 fit on the posts 90 of the entry plate 20 with the cylindrical split pins 54 disposed in the channel 92 surrounding the posts 90 (see, FIG. 9). The hang cord 60 is then connected to a suitable hook, etc. (not shown) and the gap 100 defined between the lid 50 and the entry plate surface 22 enables the flying insects to enter into the entry ports 26 and into the bag for containment. When the bag is to be disposed, the lid 50 is removed from the entry plate 20 in its second position and the lid pins 54 are inserted into the sockets 80 of the entry plate, see FIG. 6, to enable a seal to form between the lid edge 52 and the entry plate channel 25. Spillage is thus prevented and the bag is disposed of.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A disposable flying insect trap comprising:
an insect entry plate with a plastic bag secured to and hanging from a plate periphery, said plastic bag containing insect attractant, said entry plate including at least one entry port for guiding flying insects into said plastic bag for capture therein and a channel extending around said entry port, said entry plate further including a plurality of sockets and a plurality of posts; and
a lid having a plurality of pins positioned complementary to said sockets and an edge correspondingly shaped with said channel so that said lid is connectable to said entry plate in a first position by inserting the pins within the sockets and inserting the edge within the channel, said first position sealing said lid to said entry plate so as to close the entry port to the surrounding environment and prevent leakage of liquid therefrom, said pins of said lid further defining open cylindrical recesses to receive the posts of said entry plate to connect said lid to said entry plate in a second position by inserting said posts within the open cylindrical recesses of said pins, said lid in said second position being displaced from said entry plate to open the entry port to the surrounding environment.

2. The insect trap of claim 1, wherein each of said pins includes a cylindrical wall having slits to enable wall flexibility, said cylindrical wall defining said open cylindrical recess.

3. The insect trap of claim 1, wherein said lid is spaced from an upper surface of said entry plate when said posts are inserted within said pins.

4. The insect trap of claim 1, wherein said entry plate and said lid each have circular profiles and wherein said entry plate has a top entry surface with a circular channel adjacent the plate periphery, and wherein said lid includes a circumferential edge insertable within said channel to form a seal between said lid and said entry plate.

5. The insect trap of claim 1, wherein said entry plate includes a plurality of integral entry ports each including conically-shaped extensions disposed toward the interior of the plastic bag.

6. The insect trap of claim 1, further comprising a hang cord having opposite cord ends retained by said entry plate, said hang cord extending from the entry plate and through lid holes in said lid to form a loop above said lid.

7. The insect trap of claim 6, wherein said lid holes are offset from where the cord ends are retained by said entry plate, such that a pulling of the hang cord results in an upwardly directed force on the lid to disengage the lid from said first connected position with the entry plate.

8. The insect trap of claim 1, wherein said entry plate is made of a rigid PVC material.

9. The insect trap of claim 1, wherein said channel is continuous.

10. The insect trap of claim 1, wherein said channel is positioned adjacent said plate periphery.

11. An insect trap comprising,
an insect entry plate defining a plate periphery and a plastic bag, with insect attractant therein, secured to and hanging from the plate periphery to define a bag interior, said entry plate including at least one entry port through which insects can pass for capture within the bag interior;
a lid overlying and sealingly engagable with said entry plate to close the entry port and bag interior to the environment, said lid having a pair of lid holes for enabling a hang cord to pass therethrough; and
a hang cord having opposite cord ends retained by said entry plate at spaced apart locations, said cord extending from the entry plate and through the lid holes to form a loop to enable hanging of the insect trap, said lid holes being offset from said spaced apart locations of the entry plate such that a portion of the cord has a component that lies between said lid and said entry plate and an upward pulling force on the cord provides a force acting on the lid to displace the lid from the entry plate.

12. The insect trap of claim 11, wherein said entry plate includes entry plate cord holes at said spaced apart locations and said cord is retained by said entry plate by knotting said cord below the entry plate cord holes.

13. The insect trap of claim 12, wherein said entry plate cord holes are positioned so as to underlie said lid.

14. A disposable flying insect trap comprising,
an insect entry plate having a peripheral skirt defining a plastic bag mounting surface, and a clamping element disposed about said skirt for clamping a plastic bag between the bag mounting surface and the clamping element, said plastic bag defining a bag interior and containing insect attractant;
a plurality of entry ports through the entry plate in communication with the plastic bag interior, said entry ports providing an entry for liquid to be deposited within said plastic bag and further enabling insects to pass therethrough for capture within the bag interior;
a lid securable to said entry plate in a first position that overlies said entry plate and seals said lid against said entry plate to cover the entry ports and seal the bag interior from the environment prior to use and after use, and in a second in-use position where the lid is displaced from, and supported by, said entry plate to define a gap therebetween to open the entry ports to the surrounding environment and allow flying insects to access said entry ports.

15. The insect trap of claim 14, wherein said entry plate includes a plurality of sockets and said lid includes a plurality of pins positioned complementary to said sockets, wherein said lid is securable to said entry plate in said first position by insertion of the pins within the sockets in frictional engagement therewith.

16. The insect trap of claim 15, wherein said entry plate further includes a plurality of posts and said pins of said lid define open cylindrical recesses to receive the posts of said entry plate to connect said lid to said entry plate in said second position by insertion of said posts within the open cylindrical recesses of said pins.

17. The insect trap of claim 16, wherein each of said pins includes a cylindrical wall having slits to enable wall flexibility, said cylindrical wall defining said open cylindrical recess.

18. The insect trap of claim 16, wherein said lid is spaced from an upper surface of said entry plate when said posts are inserted within said pins.

19. The insect trap of claim 14, wherein said entry plate, said lid and said clamping element all have circular profiles and wherein said entry plate has a top entry surface with a circular channel adjacent the plate periphery, and wherein said lid includes a circumferential edge insertable within said channel to form a seal between said lid and said entry plate.

20. The insect trap of claim 14, further comprising a hang cord having opposite cord ends retained by said entry plate, said hang cord extending from the entry plate and through lid holes in said lid to form a loop above said lid.

21. The insect trap of claim 20, wherein said lid holes are offset from where the cord ends are retained by said entry plate, such that a pulling of the hang cord results in an upwardly directed force on the lid to disengage the lid from said first connected position with the entry plate.

22. A disposable flying insect trap comprising:
   an insect entry plate having a circular profile with a plastic bag secured to and hanging from a plate periphery, said plastic bag adapted to receive insect attractant, said entry plate including an entry port through which insects can pass for capture within said plastic bag and a top entry surface with a circular channel adjacent the plate periphery; and
   a lid having a circular profile and being connectable to said entry plate in a first position that seals said lid to said entry plate to close the entry port to the surrounding environment, and connectable to said entry plate in a second position where the lid is displaced from said entry plate to open the entry port to the surrounding environment, said lid including a circumferential edge insertable within said channel in said entry plate to form a seal between said lid and said entry plate.

23. A disposable flying insect trap comprising:
   an insect entry plate with a plastic bag secured to and hanging from a plate periphery, said plastic bag adapted to receive insect attractant, said entry plate including an entry port through which insects can pass for capture within said plastic bag;
   a lid connectable to said entry plate in a first position that seals said lid to said entry plate to close the entry port to the surrounding environment, and connectable to said entry plate in a second position where the lid is displaced from said entry plate to open the entry port to the surrounding environment; and
   a hang cord having opposite cord ends retained by said entry plate, said hang cord extending from the entry plate and through lid holes in said lid to form a loop above said lid.

24. The insect trap of claim 23, wherein said lid holes are offset from where the cord ends are retained by said entry plate, such that a pulling of the hang cord results in an upwardly directed force on the lid to disengage the lid from said first connected position with the entry plate.

25. The insect trap of claim 23, wherein said entry plate includes entry plate cord holes at said spaced apart locations positioned so as to underlie said lid, said cord being retained by said entry plate by knotting said cord below the entry plate cord holes.

26. A disposable flying insect trap comprising:
   an insect entry plate with a plastic bag secured to and hanging from a plate periphery, said plastic bag containing insect attractant, said entry plate including at least one entry port for guiding flying insects into said plastic bag for capture therein; and
   a lid connectable to said entry plate in a first position that seals said lid to said entry plate to close the entry port to the surrounding environment and connectable to said entry plate in a second position where the lid is displaced from said entry plate to open the entry port to the surrounding environment; and
   said entry plate including a plurality of posts configured to be inserted into corresponding recesses in said lid to thereby connect said lid to said entry plate in said second position.

27. The insect trap of claim 26, wherein said recesses are associated with pins that project from said lid and engage with corresponding recesses in said entry plate to connect said lid to said entry plate in said first position.

* * * * *